UNITED STATES PATENT OFFICE.

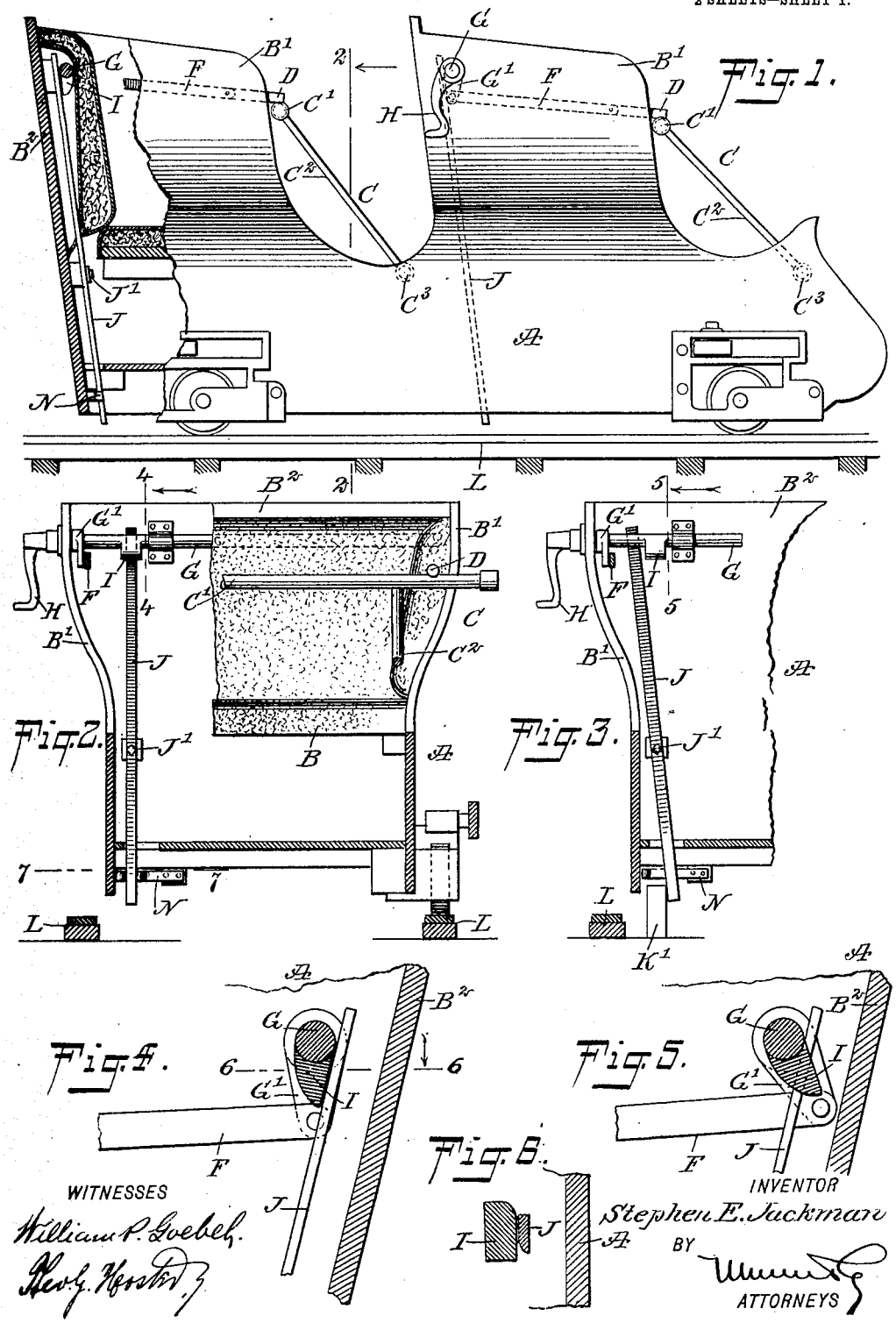

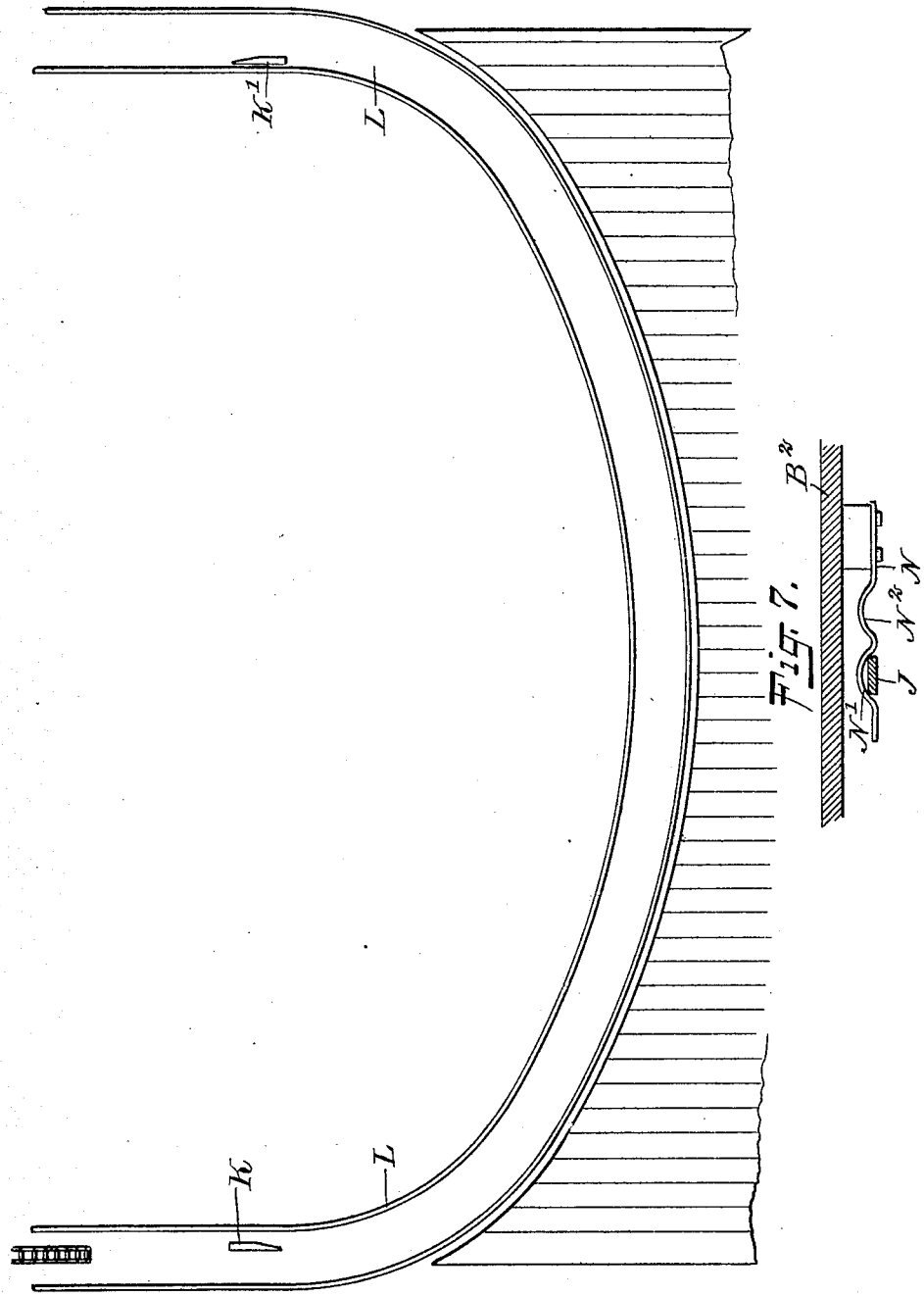

STEPHEN EDWARD JACKMAN, OF NEW YORK, N. Y.

LOCKING DEVICE FOR SEAT-GUARDS.

No. 916,157.  Specification of Letters Patent.  Patented March 23, 1909.

Application filed July 25, 1908. Serial No. 445,357.

*To all whom it may concern:*

Be it known that I, STEPHEN E. JACKMAN, a citizen of the United States, and a resident of the city of New York, Coney Island, borough of Brooklyn, in the county of Kings and State of New York, have invented a new and Improved Locking Device for Seat-Guards, of which the following is a full, clear, and exact description.

The invention relates to locking devices for seat-guards used on cars, boats and like vehicles, such as are run on inclined pleasure railways and such as shown and described in the Letters Patent of the United States, No. 745,854, granted to me on December 1, 1903.

The object of the invention is to provide a new and improved locking device for seat-guards, arranged to prevent passengers in a vehicle from tampering with the guard thereof during the ride, by providing a manually-controlled locking device under the control of the car despatcher, and an automatic locking device for locking the said manually-controlled locking device after the car is on its journey, the said automatic locking device being automatically unlocked at the time the car nears the home-stretch, to allow an attendant at the disembarking station to unlock the seat guard and open the same for the passengers to disembark.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied to a two-seat car, parts being in section; Fig. 2 is a cross section of the same on the line 2—2 of Fig. 1; Fig. 3 is a similar view of the same but showing the parts in a different position; Fig. 4 is an enlarged sectional side elevation of the same on the line 4—4 of Fig. 2; Fig. 5 is a similar view of the same on the line 5—5 of Fig. 3; Fig. 6 is a sectional plan view of the same on the line 6—6 of Fig. 4; Fig. 7 is an enlarged sectional plan view of the retaining device for the locking lever, the section being on the line 7—7 of Fig. 2; and Fig. 8 is a plan view of the track at the station and showing the cams for automatically locking and unlocking the automatic locking device.

The car, boat or other vehicle A is provided with one or more seats B, and a seat-guard C for each seat, having a cross bar C′ extending across the seat and adapted to rest against the front edges of the sides or arms B′ of the seat, the cross bar C′ being readily attached to the upper ends of arms C², fulcrumed at their lower ends at C³, to the sides of the vehicle body near the bottom thereof and a distance in front of the seat B.

In order to lock the seat-guard C in the closed position shown in Fig. 1, bolts D are adapted to be moved over the cross bars C′, as indicated in Fig. 1, the said bolts D being mounted to slide longitudinally in suitable bearings held in the sides B′ of the seat B. The rear ends of the bolts D are pivotally connected by links F with crank arms G′ on a shaft G, extending transversely and journaled in suitable bearings on the back B² of the seat B, and on one outer end of the shaft G is secured a handle H, adapted to be taken hold of by the operator, for imparting a turning motion to the shaft G, so as to shoot the bolts D outward into a locking position, as shown in Fig. 1, or inward into an unlocking position, according to the direction in which the handle H is swung.

The construction of the so-called locking device is the same as the one referred to in the patent above mentioned, and in order to automatically lock this locking device during the time the car A is on its journey, the following arrangement is made: On the shaft G is secured or formed a lug I, adapted to be engaged by the upper end of an upwardly-extending lever J, fulcrumed at J′ on the back B² of the seat B, the lower end of the said lever J being adapted to be engaged by cams K and K′, of which the cam K is fixed in the track L on which travels the car A at the beginning portion of the track, while the cam K′ is located at the end of the home-stretch portion of the track (see Fig. 8). The cams K and K′ are disposed in opposite directions, so that the cam K shifts the lever J, with a view to move the upper end thereof in engagement with the lug I, to hold the shaft G against turning, while the cam K′ is adapted to shift the lever J in the opposite direction, to move the upper end of the lever out of engagement with the lug I, to allow turning of the shaft G by the operator manipulating the handle H. In order to hold the lever J against accidental movement after being shifted into either one of its two positions, a retaining spring N is provided, attached to the back B² of the seat B, and having two undulations N', N² for engagement with the lever J, as plainly indicated in Fig. 7, see also Figs. 2 and 3. The lug I and the lever J are preferably rounded at the corners, first coming in contact with each other when moving the lever J in engaging position relative to the lug I, so that the lever J moves into engaging position even if the shaft G is not turned sufficiently far by the operator turning the handle H on starting the car on its journey.

The operation is as follows: When the car is at the station, then the bolts D are withdrawn and the seat-guards C are swung forward to permit the passengers to readily enter the car and seat themselves on the seats B. The car starter now swings the seat-guard C backward into the position shown in Fig. 1, and then turns the handle H, so as to shoot out the bolts D over the cross bars C', to securely lock the seat-guard in front of the passengers and thus prevent them from leaving the seats, at the same time, however, allowing the passengers to take hold of the cross bars C' and thus steady themselves when the car is going down a steep incline, around sharp curves and the like. Immediately the car has started on its journey the lever J comes in contact with the cam K, so that a transverse swinging motion is given to the lever J, to move the upper end thereof behind the lug I, thus locking the shaft G against turning during the travel of the car over the track. Now it is evident that as the lever J, the shaft G and lug I are out of reach of the passengers, especially as the said parts are covered by the upholstery, it is evident that the lever J cannot be tampered with during the ride, and hence it is utterly impossible for the passengers to unlock and open the seat-guards C. When the car reaches the end of the home-stretch, the lower end of the lever J comes in contact with the cam K', which imparts a reverse swinging motion to the lever J, thus moving the latter out of engagement with the lug I and thereby allowing the shaft G to be turned, which is done by the attendant in charge at the disembarking station. Now by the operator turning the handle H in a reverse direction the bolts D are withdrawn from the cross bars C', to allow of swinging the seat-guards open, thus releasing the passengers and permitting them to disembark.

It is understood that when the lever J is out of engagement with the lug I, the shaft G can be turned to withdraw the bolts D, as will be readily understood by reference to Figs. 3 and 5.

From the foregoing it will be seen that two locking devices are provided, of which one is manually controlled and serves to lock the seat-guards in a closed position, and the other locking device is automatic and serves to lock the manually-controlled locking device during the time the car is on its journey over the track.

By having this locking device completely concealed and out of reach of the passengers, there is no possible danger that the seat-guard C can be opened during the ride.

Having thus described my invention, I claim as new and desire to secure by Letters Patent:

1. In combination, a vehicle seat-guard, a manually-controlled locking device for locking the said seat-guard, and an automatic locking device for locking the said manually controlled locking device.

2. In combination, a vehicle having a seat-guard, a manually-controlled locking device on the vehicle for locking and unlocking the said seat-guard, and an automatic locking device for locking and unlocking the said manually-controlled locking device.

3. In combination, a vehicle having a seat-guard, a manually-controlled locking device on the vehicle for locking and unlocking the said seat-guard, a second locking device on the vehicle for locking and unlocking the said manually-controlled locking device, and means in the track of the vehicle for actuating the said locking device.

4. In combination, a vehicle having a seat-guard, a manually-controlled locking device on the vehicle for locking and unlocking the said seat-guard, a locking lever fulcrumed on the vehicle and adapted to engage and lock the said manually-controlled locking device, and a cam in the beginning portion of the track of the vehicle and adapted to engage the said lever to move the latter into locking position.

5. In combination, a vehicle having a seat-guard, a manually-controlled locking device on the vehicle for locking and unlocking the said seat-guard, a locking lever fulcrumed on the vehicle and adapted to engage and lock the said manually-controlled locking device, a cam in the beginning portion of the track of the vehicle and adapted to engage the said lever to move the latter into locking position, and a second cam in the home-stretch portion of the track and adapted to engage the said locking lever and move it into position.

6. In combination, a vehicle having a seat-guard, a manually-controlled locking device on the vehicle for locking and unlocking the said seat guard, a second locking device on the vehicle for locking and unlocking the said manually controlled locking device, means in the track of the vehicle for actuating the said second locking device, and means for retaining the said second locking device in locked or unlocked position.

7. A locking device for a seat-guard of a vehicle, comprising a bolt for engagement with the seat-guard, a crank shaft journaled on the vehicle and connected with the said bolt, a locking lever fulcrumed on the vehicle and adapted to engage the said shaft to lock the latter against turning, and a cam in the track of the vehicle to actuate the said locking lever.

8. A locking device for a seat-guard of a vehicle, comprising a bolt for engagement with the seat guard, a crank shaft journaled on the vehicle and connected with the said bolt, a locking lever fulcrumed on the vehicle and adapted to engage the said shaft to lock the latter against turning, a cam in the track of the vehicle to actuate the said locking lever, and a retaining spring engaging the said lever to hold the latter in locked and unlocked position.

9. A locking device for a seat-guard of a vehicle, comprising a bolt for engagement with the seat-guard, a crank shaft journaled on the wheel and connected with the said bolt, a lug on the said crank shaft, a locking lever fulcrumed on the vehicle and adapted to engage the said lug to lock the crank shaft against turning, and a cam in the track for actuating the said locking lever.

In testimony whereof I have signed my name to this specification in the presence of two subscribing witnesses.

STEPHEN EDWARD JACKMAN.

Witnesses:
RICHARD O. SHAUB,
JOHN H. WAHLEN.